(12) United States Patent
O'Connor et al.

(10) Patent No.: US 10,104,130 B2
(45) Date of Patent: Oct. 16, 2018

(54) SYSTEM AND METHOD FOR ENSURING HIGH AVAILABILITY IN AN ENTERPRISE IMS NETWORK

(71) Applicant: Avaya Inc., Basking Ridge, NJ (US)

(72) Inventors: Neil O'Connor, Galway (IE); Diarmuid Leonard, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 786 days.

(21) Appl. No.: 13/629,864

(22) Filed: Sep. 28, 2012

(65) Prior Publication Data
US 2014/0095688 A1 Apr. 3, 2014

(51) Int. Cl.
*G06F 15/173* (2006.01)
*H04L 29/06* (2006.01)
(Continued)

(52) U.S. Cl.
CPC ...... *H04L 65/1016* (2013.01); *H04L 43/0817* (2013.01); *H04L 65/1063* (2013.01);
(Continued)

(58) Field of Classification Search
CPC ............... H04L 29/06217; H04L 29/14; H04L 65/1016; H04L 69/40; H04L 67/1002;
(Continued)

(56) References Cited

U.S. PATENT DOCUMENTS

| | | | |
|---|---|---|---|
| 6,553,515 B1 * | 4/2003 | Gross | H04L 12/2602 709/224 |
| 7,688,804 B2 | 3/2010 | Peters | |

(Continued)

FOREIGN PATENT DOCUMENTS

| | | |
|---|---|---|
| CN | 101517555 | 8/2009 |
| CN | 102223248 A | 10/2011 |

(Continued)

OTHER PUBLICATIONS

Hammer, M, Redundancy and Scalability in IMS, IEEE 12th International Telecommunications Network Strategy and Planning Symposium, New Delhi, 2006, pp. 1-6.*

(Continued)

*Primary Examiner* — SM Rahman
*Assistant Examiner* — Ranjan Pant
(74) *Attorney, Agent, or Firm* — Stevens & Showalter, LLP

(57) ABSTRACT

Embodiments of the present invention may enable applications that are deployed at the application layer of an IMS network to frequently carry out business critical functions via a highly available application server architecture. This may be achieved by using a session manager that manages the role of active and standby server(s) of the highly available application architecture. Further, the session manager may manage the roles of the active and standby server(s) by routing SIP messaging in either serial or parallel fashion to the application server architecture. Furthermore, the active and the standby servers are automatically kept in sync by their position in the signaling path determined by the session manager. The session manager makes sure that if the active server goes down, then the standby server must be able to take over the role of the active server in a seamless fashion.

25 Claims, 7 Drawing Sheets

(51) Int. Cl.
*H04L 12/26* (2006.01)
*H04L 29/08* (2006.01)
*H04L 29/14* (2006.01)

(52) U.S. Cl.
CPC ...... *H04L 65/1073* (2013.01); *H04L 67/1034* (2013.01); *H04L 69/40* (2013.01)

(58) Field of Classification Search
CPC ......... H04L 45/00; H04L 43/00; H04L 47/00; H04L 47/12; H04L 67/1029; H04L 67/1034; H04L 67/1095; H04L 41/06; H04L 67/1025; H04L 67/2885; H04W 28/08; H04W 40/20; H04W 76/02; H04W 80/04; H04W 8/12; H04W 24/04; G06F 11/2028; G06F 11/2097
See application file for complete search history.

(56) References Cited

U.S. PATENT DOCUMENTS

| | | | | |
|---|---|---|---|---|
| 7,912,075 B1* | 3/2011 | Holland | | H04L 65/80 370/216 |
| 7,995,466 B2* | 8/2011 | Baker | | H04L 41/046 370/218 |
| 2003/0005350 A1* | 1/2003 | Koning | | H04L 67/1002 714/4.11 |
| 2006/0031521 A1* | 2/2006 | Wilk | | G06F 11/0709 709/227 |
| 2006/0179081 A1* | 8/2006 | Vedula | | G06F 11/2097 |
| 2008/0014961 A1* | 1/2008 | Lipps | | H04L 65/1016 455/456.1 |
| 2008/0228926 A1* | 9/2008 | Shiratzky | | H04L 65/1069 709/228 |
| 2011/0173441 A1* | 7/2011 | Bagepalli | | H04L 63/166 713/153 |
| 2012/0082158 A1* | 4/2012 | Reddy | | H04W 80/045 370/389 |
| 2012/0110372 A1* | 5/2012 | Borgendale | | G06F 9/546 714/4.11 |
| 2012/0252481 A1* | 10/2012 | Anpat et al. | | 455/456.1 |
| 2013/0246597 A1* | 9/2013 | Iizawa | | H04L 69/40 709/223 |
| 2013/0297804 A1* | 11/2013 | Francis | | H04L 67/1002 709/226 |
| 2014/0019626 A1* | 1/2014 | Hubler | | H04L 65/1006 709/227 |

FOREIGN PATENT DOCUMENTS

| | | |
|---|---|---|
| CN | 102255747 A | 11/2011 |
| WO | 2008008226 A2 | 1/2008 |

OTHER PUBLICATIONS

Hammer, M, Redundancy and Scalability in IMS, IEEE 12th International Telecommunications Network Strategy and Planning Symposium, New Delhi, 2006, pp. 1-6.*
Wang, Xing; First Office Action; Chinese Patent Application No. 201310265220.2; dated Jul. 5, 2016; State intellectual Property Office of the People's Republic of China.
Wang, Zhihao; Third Office Action; dated Jun. 1, 2017; Chinese Patent Application No. 201310265220.2; State intellectual Property Office of the People's Republic of China.
Wang, Zhihao; Second Office Action; dated Feb. 22, 2017; Chinese Patent Application No. 201310265220.2; State intellectual Property Office of the People's Republic of China.
Wang Zhihao; Fourth Office Action; Chinese Patent Application No. 201310265220.2; Apr. 20, 2018; State Intellectual Property Office of People's ROC; Beijing, China.

* cited by examiner

SYSTEM AND METHOD FOR ENSURING HIGH AVAILABILITY IN AN ENTERPRISE IMS NETWORK

BACKGROUND

Field of the Invention

The invention relates generally to communication networks. More specifically, the invention relates to maintenance of high availability in an enterprise IMS network.

Description of Related Art

Generally, applications that are deployed at the applications layer of an IMS network frequently carry out business critical functions. Therefore, high availability and zero service interruption are important considerations for such applications. Conventionally, many enterprise IMS applications implement the high availability by the server in the active role sending information using an out-of-band mechanism to its nominated standby server. Often, specialist application vendors are forced into this complex approach as they have no influence or product capability in the area of IMS session management.

Another method of achieving the goal of maintaining high availability and zero service interruption may be through redundancies, i.e. by having multiple backup servers that are capable of taking over, in the event of complete failure of the one or more servers. The difficulty in implementing that goal is that the redundant component(s) cannot be normally and naturally used as a standby server while still being included in the signaling path, i.e. the redundant components do not normally and naturally receive the same information that the primary component receives. Additionally, maintenance of the redundant components is very expensive and difficult.

Therefore, improvements in the conventional technology, of providing high availability of application servers, are required to implement the highly available servers in an easier and cheaper manner. Further, techniques are required to improve the reliability on the fault tolerance capabilities of the application servers to ensure zero downtime in the events of failure.

SUMMARY

Embodiments in accordance with the present invention provide a high availability enterprise IMS system comprising an active application server. The active application server may provide services to its designated customers. Further, the IMS system comprises a standby application server for ensuring high availability by being in a completely synchronized state with the active application server and by being capable of functioning as the active application server. Furthermore, the IMS system comprises a session manager for sequencing, management and synchronization of the active and standby application servers by informing the application servers of their active/standby roles and by routing SIP messages in at least a serial fashion to the application servers. A session manager as used herein may refer to an IP Multimedia Subsystem (IMS) Serving Call State Control Function (S-CSCF) as known in the art, with an optional high availability (HA) component.

In another embodiment of the present invention, a high availability enterprise IMS system is provided. The IMS system comprises of an active application server. The active application server may provide services to its designated customers. Further, the IMS system comprises a standby application server for ensuring high availability by being in a completely synchronized state with the active application server and by being capable of functioning as the active application server. Furthermore, the IMS system comprises a session manager for sequencing, management and synchronization of the active and standby application servers by informing the application servers of their active/standby roles and by routing SIP messages in at least a parallel fashion to the application servers.

In either the serial or parallel configuration, embodiments of the standby application server may include multiple backup servers for providing high availability services to its clients. The multiple backup servers are managed by a session manager.

In yet another embodiment of the present invention, a method of providing high availability enterprise IMS system is disclosed. The method includes synchronization and management of a highly available pair of active and standby application servers by informing the servers of their active/standby roles via a session manager and routing SIP messaging in either serial or parallel fashion to the application servers. Further, the method includes seamless takeover by the standby application server to function as the active application server based on instructions received from the session manager.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
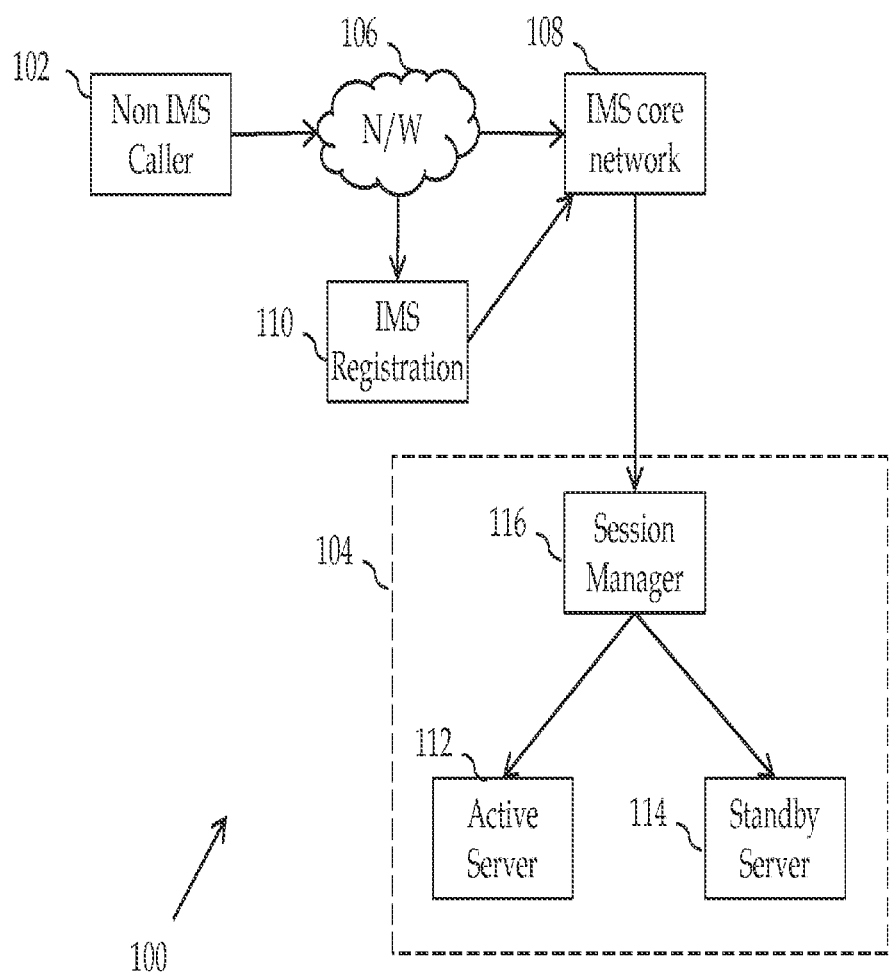
FIG. 1 is a simplified block diagram of an environment, where various embodiments of the present invention may function.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Illustrative embodiments of the invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 is a simplified block diagram of an environment 100, where various embodiments of the present invention may function. As shown, a non-IMS caller 102 may be connected to an organization 104 that provides online services to its clients, via a network 106. The network 106 may be any network, such as, but is not restricted to, GSM network, IP network, PSTN etc. Further, the organization 104 may be connected to an IMS core network 108. Therefore, any caller must be registered to the IMS network in order to communicate with the organization 104. In an exemplary embodiment of the present invention, the organization 104 may provide high availability network services to its clients, i.e. the chances of failure of service from the organization may be negligible.

In an embodiment, the non IMS caller may be using a GSM phone to connect to the organization 104 that is accessible via IMS network only. Here, the caller 102 may connect to the GSM network 106 in order to register itself at the IMS registration centre 110. The IMS registration centre 110 may allow access to the caller 102 to connect with the IMS core network 108. Thereafter, the caller 102 may be connected to its required organization 104 via the IMS core network 108. In another embodiment, the non IMS caller may be using a SIP terminal to connect to the organization 104. Therefore, the caller 102 may connect to the IP network 106 in order to register itself at the IMS registration centre 110 that may be a SIP terminal in this case. Thus the SIP terminal 110 may allow access to the caller 102 to connect with the IMS core network 108. Thereafter, the caller 102 may be connected to its required organization 104 via the IMS core network 108.

Further, during the registration process at IMS registration centre 110, the caller 102 must be registered in an S-CSCF (serving call session control function). The registration process is generally a prerequisite process before delivering calls to its destination (the contact address of the destination is usually registered in S-CSCF). Further, in a general scenario, SIP phones initiate registration on their own. However, this is not the case with the GSM phones. Therefore, there is a requirement of the registration function, such as registration 110 that handles IMS registration on behalf of GSM phones. The registration function can be realized as a stand-alone entity or can be integrated into an IMS core node 108 as well.

Furthermore, the organization 104 may include multiple servers, with one or more backup servers, such as active server 112 and standby server 114 for providing high availability services to its clients. The servers 112 and 114 are managed by a session manager 116. The session manager 116 may be configured for managing which service is to be provided to which client. The session manager 116 is configured to make sure that the active server 112 remains in service for its clients. In case, if the active server 112 goes down, the session manager 116 may track it with the non-responsive state of the active server 112 and may instruct the standby server 114 to function as active server 112. Meanwhile, the session manager 116 may keep polling the server 112 to be aware if the server 112 comes back to the service. In this way, the session manager 116 is configured to make sure that if the active server fails, the standby server takes over seamlessly, and with zero interruption in the service provided by the organization 104.

In an exemplary embodiment of the invention, the standby server 114 is kept in synchronization with the active server 112 in real time. Those skilled in the art will appreciate that the standby server may take over simply and seamlessly. The session manager 116 is configured to manage the synchronization of the standby server 114 with the active server 112. In an embodiment, the session manager 116 may be configured to follow a mechanism of providing high availability applications in an enterprise IMS network using sequencing. The session manager 116 may sequence necessary call data to the active server 112 and to standby server 114 in either series (serial sequencing) or in parallel fashion. Synchronization of the active 112 and standby 114 servers may be achieved, where the session manager 116 may act in its usual role of a CSCF (Call Session Control Function) entity. The synchronization and sequencing techniques are explained further in conjunction with FIG. 2 of the invention.

Figure 2:
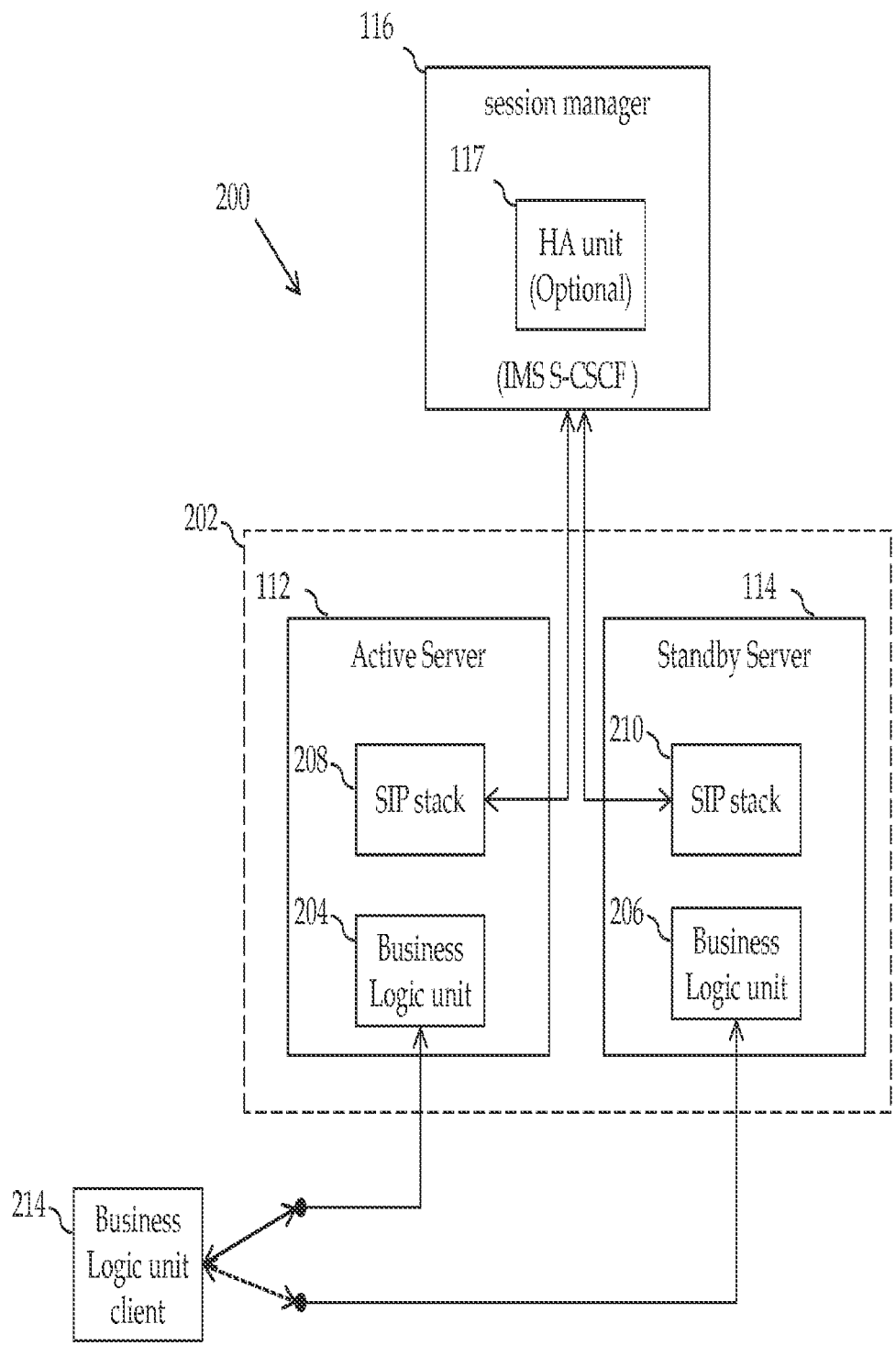
FIG. 2 is a simplified block diagram of a fault tolerant enterprise IMS system, shown generally in accordance with illustrated embodiments of the invention.

FIG. 2 is a simplified block diagram of a fault tolerant enterprise IMS system 200, shown generally in accordance with illustrated embodiments of the invention. In an exemplary embodiment of the invention, the system 200 is capable of providing enhanced high availability of services, while still retaining the loose coupling between the session and application layers of the Enterprise IMS network.

As shown, the system 200 includes the session manager 116 (as described previously in conjunction with FIG. 1 of the invention) and a high availability service-providing node 202 that serves its clients with zero interruption in service. The high availability service providing pair includes the servers 112 and 114 (as described previously in conjunction with FIG. 1 of the invention). Further, as shown, both the servers 112 and 114 include a business logic unit (204 and 206) and a SIP stack (208 and 210).

In an embodiment, the business logic units 204 and 206 may be responsible for providing services to their business logic unit client 214 based on the SIP messages sequenced from the session manager 116. Further, the SIP stack units 208 and 210 may be responsible for processing SIP events that are required to be in communication with session manager 116. In an embodiment, the business logic units and the SIP stack units may be able to function independently.

Also, in the active server 112, its business logic unit 204 and the SIP stack unit 208 may be in active state. However, in the standby server 114, the SIP stack 210 may be in active state and the business logic unit 206 may be in an inactive state. As shown, the SIP stack units 208 and 210 of the active and standby servers (112 and 114 respectively) are in communication with the session manager 116.

Further, the session manager 116 (as shown in FIG. 2) may be configured to provide a configurable high availability service option. The high availability service option can be configured to generate a serial sequencing of the standby server 114, after completion of the sequencing of the active server 112. In addition, the roles of the active server 112 and the standby server 114 may be managed by session manager 116, using a SIP-based mechanism. Further, the session manager 116 may ensure that the standby server 114 is aware of its role of being in sync-only mode. Similarly, the session manager 116 may also ensure that the active server 112 is also aware of its role of event processing. All servers will actively process SIP messages from session manager 116. However, only an active business logic unit (BLU) needs to produce events for its client. In some embodiments, some business logic (BL) client may receive a dual feed so both will produce events meaning that there is no difference at all between active and standby.

Furthermore, in an exemplary embodiment of the invention, the data and state of the standby server 114 may be same as the data and state of the active server 112. This may be possible by the synchronization between the active server 112 and the standby server 114. Also, the synchronization may be based on the sequencing techniques used by the session manager 116. However, the functionalities of the business logic units and the SIP stack units may vary in the active server 112 and the standby server 114.

The variations in functionalities may be because of the standby state of the business logic unit 206 of the standby server 114. However, the business logic state 204 of the active server may be in active state. Thereby, the standby server 114 always processes SIP events in the same way as the active server 112 does. In case, where the active server 112 malfunctions, and the session manager 116 instructs the standby server 114 to take over the role of the active server 112 seamlessly, then the standby server 114 may simply signal its business logic unit 206 to serve its designated clients.

In an exemplary embodiment of the present invention, the process of synchronization is handled by the session manager 116. Further, in the exemplary embodiment of the invention, the main role of the session manager 116 is to define roles to the active server 112 and the standby server 114. Therefore, there is no need for the active server 112 and the standby server 114 to communicate and coordinate with each other to decide who will perform which role at a particular time period.

For example, if at a moment, the active server 112 goes down, then the standby server 114 will not rely on the active server 112 for such information, neither the standby server needs to direct poll the active server 112 regularly to determine if the active server is functioning properly or not. Direct polling imposes an extra work load on the servers and may not be a very reliable technique. Therefore, this duty is fulfilled by the session manager 116 in order to keep the active server 112 and the standby server 114 independent of the state of each other. This enhances the fault tolerance capacity of the system 200 and ensures that there is zero interruption in the services being provided to the clients.

Further, the session manager 116 may be configured to use a SIP "OPTIONS" or other SIP based health-check mechanism to determine the status of each of the servers 112 and 114. The status check of the servers 112 and 114 may ensure the session manager 116 that the services are being provided to the clients seamlessly, and in case of any failure, the session manager 116 may realize the failure and may update the standby server 114 to takeover, even before an interruption to the services provided to the clients. The BLU 204 may communicate to the session manager 116 that it is about to fail, effectively requesting a fail-over. For example, conditions that may be detectable in advance and triggering a requested fail-over may include running low on memory, or an administrator having instructed server 112 and/or BLU 204 to shutdown and so forth.

Also, the session manager 116 may be configured to detect any lack of responsiveness to any SIP request by the active server 112 to determine if the active server 112 is malfunctioning. Therefore, whenever the active server goes down, the session manager 116 may instruct the standby server 114, on time, to take over the role of the active server by sending a SIP OPTIONS message to SIP stack 210, which is then passed to the standby BLU 206, which then takes over.

Further, in an embodiment, the session manager 116 may be capable of switching the roles of the active and standby servers even in the case when the active server is not in a malfunctioning stage. This may be required in case where the session manager 116 determines any issues with the active server 112 that may lead to its malfunctioning in future. Also, the session manager 116 may switch the roles of the servers in case of any maintenance required by the system 200.

In case, if the session manager 116 determines that failover in the system is necessary, then the session manager 116 may trigger a failover by sending a SIP message to the standby server 114. The standby server 114 may only need to activate its business logic unit 206 since its SIP stack unit 210 is already active. Further, the session manager 116 may remove the previously active server 112 from the signaling path of subsequent messages only if it determines that it is down (unresponsive or otherwise incapable of processing SIP messages).

Further, after detection of the unresponsive state of the active server 112, the session manager 116 may automatically remove the active server 112 from the sequence. It also informs the standby server 114 to change its role to active (conveyed using an OPTIONS or INFO command), and continues to sequence the newly active server 112 only. In this way, the standby server 114 takes over seamlessly and without interruption to service. Further, the session manager 116 may continue to poll the unresponsive server 112 (with SIP OPTIONS command) in order to discover any restoration of service in the active server 112.

Some applications require that a call setup should not proceed unless it is highly available. Consequently, in another exemplary embodiment of the present invention, the sequencing of the active server 112 and the standby server 114 may optionally be performed in the context of an atomic network transaction. The atomic network transaction guarantees that a transaction may either be completely rolled backed or may be completely successful. This may ensure that the sequenced event arrives at the same time at both servers, which enables the standby server 114 to take over the active server 112 at any timestamp as the standby server 114 and the active server 112 are completely sequenced and synchronized by the session manager 116.

Figure 3:
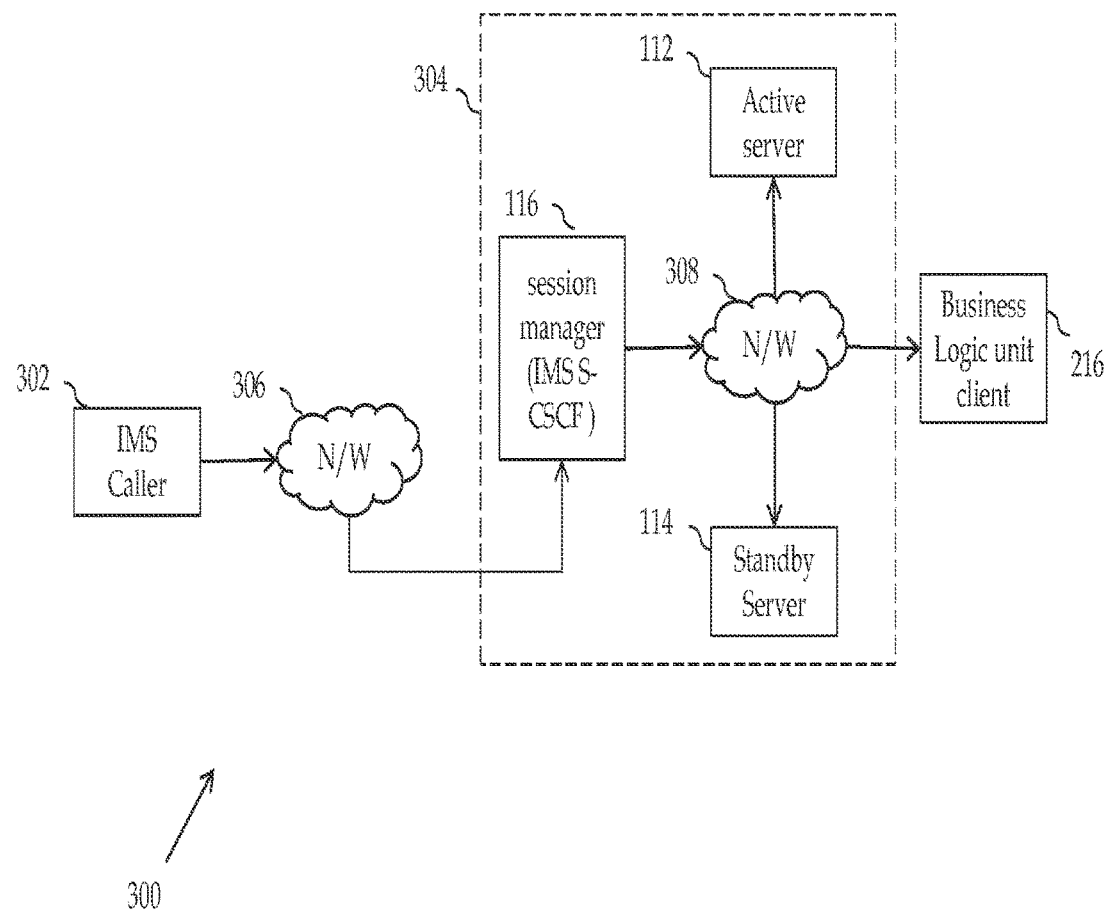
FIG. 3 is a simplified block diagram of another environment, where various embodiments of the present invention may function.

FIG. 3 is a simplified block diagram of another environment 300, where various embodiments of the present invention may function. As shown, an IMS caller 302 is connected to an organization 304 that provides online services to its clients, via a network 306. The network 306 may be an IMS network. Further, in an exemplary embodiment of the present invention, the organization 304 may provide high availability network services to its clients by placing its active and standby servers (such as active server 112 and standby server 114) in separate geographical locations from each other and from their session manager (such as session manager 116). This may provide an extra degree of availability and/or reliability to the service provided by the organization 304 and may also add on to the reliability on the services.

Further, as shown in FIG. 3, the session manager 116, active server 112, and standby server 114 are all connected via the network 308. The network 308 may be any network, such as but is not restricted to, IP network, IMS network, GSM network, CDMA network, or PSTN etc. In case if the network 308 is an IMS network then the session manager 116, active server 112, and standby server 114 may be able to directly communicate with each other, as they are all connected via same network. On the other hand, if the network 308 is any other network than the IMS network then the extra layer of security may be required to be passed by the session manager 116, active server 112, and standby server 114. In an embodiment, the session manager 116, active server 112, and standby server 114 may need to register themselves at an IMS network (as shown previously in FIG. 1) in order to communicate with each other. Additionally, to configure this feature in the session manager 116, a new optional field within the SIP Entity configuration for a sequenced server can be made visible to its administrator. The administrator may enter a fully qualified name of the standby server for the application (SIP Entity) that is to act as the standby for the initially active server.

In the environment 300, the setup time of the call made by the caller 302 to the organization 304 can be reduced by configuring the session manager 116 of the organization 304 to sequence the active and standby servers (112 and 114 respectively) in parallel fashion, rather than serially. Further, the session manager 116 can be configured to use its "parallel mode" of providing high availability application support to its clients, as both the active and standby servers (112 and 114 respectively) are located geographically in a remote location from the session manager 116. Here, the session manager 116 may fork the sequence (such as 'invite' sequence) to both active and standby servers (112 and 114 respectively). The forking of the invite sequence may create a copy of the sequence. Therefore same sequence can be sent to both the servers in parallel fashion via the IMS network.

Further, after completion of the sequence by the standby server 114, the standby server 114 will send its sequence back to the session manager 116. The session manager 116 in this situation does not propagate the standby server 114 sequence to its next SIP entity. Also, transaction isolation can be achieved by configuring the session manager 116 to ensure that both servers 112 and 114 have processed the sequence before continuing with the next stage of processing.

Alternatively, in a parallel forking scenario, the HA unit 117 residing on session manager 116 may proceed to the next hop (e.g., message 460 of FIG. 4) on receipt of an INVITE (phase done) from the active server 112 but without having received an INVITE from the standby server(s). Later, when SIP response messages are received from the downstream hop, adherence to RFC-3261 will ensure that the active server 112 is included in the signaling path. Since the standby server 114 is not in the SIP signaling path, the session manager 116 must copy the response (in the appropriate dialog) to the standby server 114. Effectively, the session manager 116 is strategically forking and terminating sequence dialogs within the enterprise IMS network in a targeted way. This causes the standby server 114 to shadow the active server 112. As a result, the standby server 114 is kept fully in sync, and is able to take over processing for as soon as the session manager 116 detects that the active server 112 is unresponsive. Thereby, strategically, zero downtime is experienced in the event of a failure from a call signaling perspective. Additionally, to configure this feature in the session manager 116, a new field within the SIP Entity configuration for a sequenced server can be made visible to its administrator. The administrator may use the new field to control whether serial or parallel mode is desired for sequencing.

Furthermore, in an exemplary embodiment, the active and standby servers can be configured to operate in either proxy or B2B mode. The advantage of proxy mode would be faster propagation (of use particularly in the serial high availability mode), and the tradeoff for this speed being that without a B2B, status and not control of established sequencing dialogs would be possible in the event of an active server outage. The customer may have an option in this case of trading speed for desired level of functional restoration.

Figure 4:
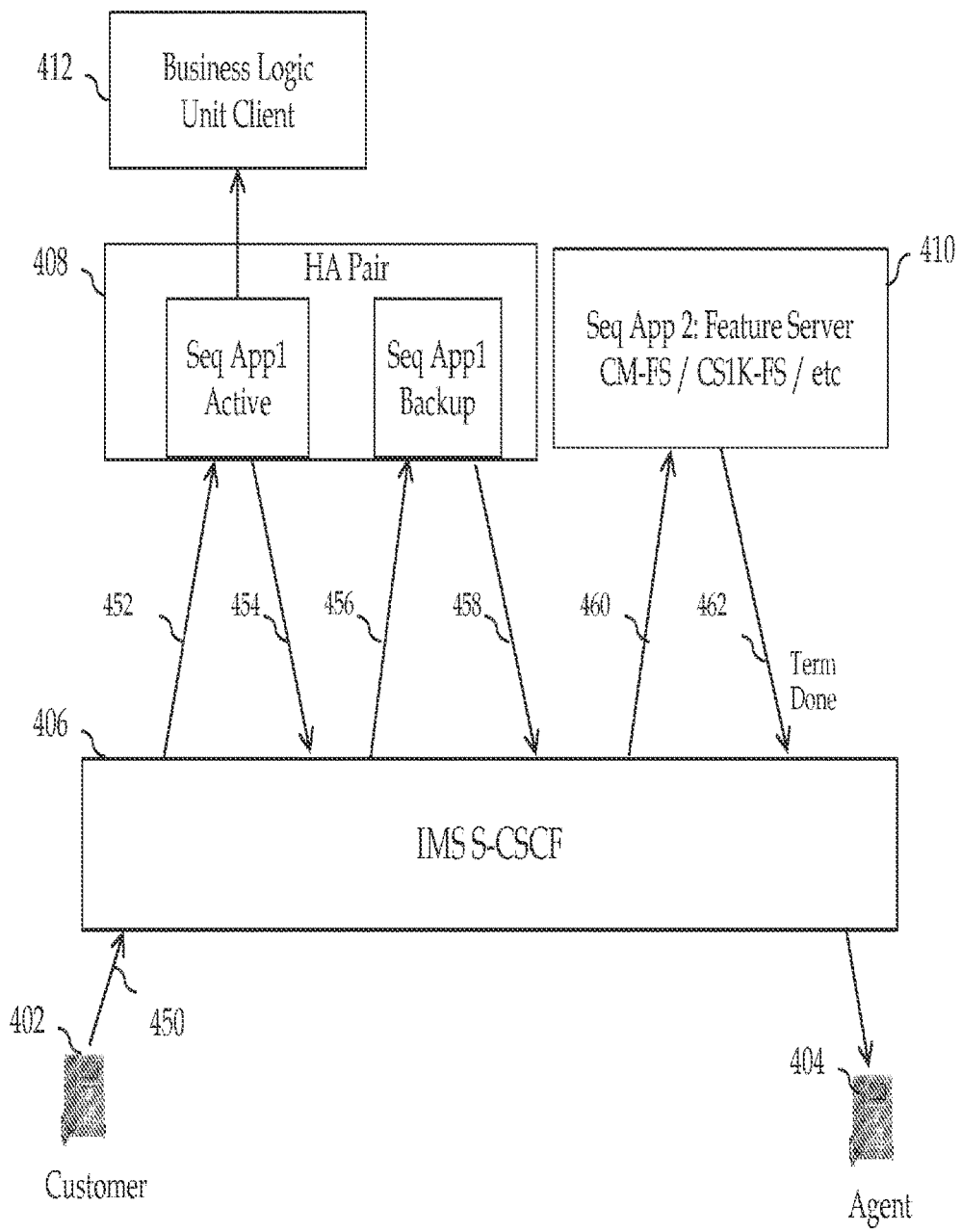
FIG. 4 is a simplified block diagram of an enterprise IMS environment for providing high availability feeds for a product, in accordance with illustrated embodiments of the invention.

FIG. 4 is a simplified block diagram of an enterprise IMS environment for providing high availability feeds for a product, in accordance with illustrated embodiments of the invention. In this situation, a product may include a feature or capability offered by a call center, etc. As shown, a customer 402 has called an agent 404. In an embodiment, both the customer 402 and the agent 404 are a part of non-IMS network. Further, the agent 404 may represent an executive or representative of an organization that provides high availability online feeds for one or more products.

As shown, the customer 402 is connected to the IMS S-CSCF node 406 (serving-call session control function node) of a signaling plane of the home network of the organization. IMS S_CSCF 406 may be basically a SIP server capable of performing session control. In an embodiment, the node 406 may act as a session manager (as explained earlier in conjunction with FIG. 1 of the invention). The node 406 is further connected to an application server 408 and another application server 410. In an embodiment, the application servers 408 and 410 are meant for different functioning that may or may not require high availability feeds. As shown, the application server 408 is a 'HA pair' that provide a high availability feed to the business logic unit client 412. On the other hand, the sequenced application on server 410 is illustrated as not providing a high availability feed for a product.

Further, the server 408 may include a pair of servers for providing high availability feeds for the business logic unit client 412. The pair of servers includes 'Sequence App 1-Active' that has been previously described as server 112 (as described previously in FIGS. 1, 2, and 3 of the present invention). Further, the pair of servers includes 'Sequence App 1-Backup' that has been previously described as server 114 (as described previously in FIGS. 1, 2, and 3 of the present invention). The 'Sequence App 1-Backup' is capable of taking over the 'Sequence App 1-Active', without any loss of service, in the event if the present application is unavailable, in order to make sure that the call processing continues as usual, uninterrupted at any event.

Further, as shown, customer 402 communicates with agent 404 first by way of message 450 sent from the customer 402 to the node 406. The node 406 communicates with the high availability server 408 by sequencing of separate applications and related messages. Sequence App1-Active receives an INVITE message 452 from node 406 and replies with message 454 to node 406. Similarly, Sequence App1-Backup receives an INVITE message 456 and replies with message 458, indicating that server 408 has finished its processing. If node 406 does not receive message 454 from Sequence App1-Active, then the Sequence App1-Backup may be instructed to take over the Sequence App1-Active. This way, the high availability for the business logic unit client 412 is maintained by the HA pair 408.

In contrast, processing of a sequenced application not requiring high availability is illustrated by communication with server 410. Node 406 sends message 460 to node 410. Server 410 performs its processing and returns a result to node 406 by way of message 462, indicating that server 410 is finished with its processing.

Furthermore, every IMS call goes through two distinct stages; originating and terminating. For any one call, the S-CSCF performs originating processing by determining a list of all the application that have been configured to be sequenced for calls originated by the caller. In FIG. 4, there are none, as the caller is outside the IMS network. Further, when all applications have been originating sequenced, the S-CSCF determines a list of all the applications that need to be term sequenced. In FIG. 4 there are three such applications that need to be term sequenced. When all apps have been term sequenced, the IMS processing is complete and the call is routed as per standard SIP. Furthermore, there are four IMS phases of interest. The first phase is "orig" where the SIP INVITE message is sent to a sequence app for originating processing. The second phase is "orig-done" where the SIP INVITE message is sent by a Sequence app back to S-CSCF to indicate that originating processing is complete. Similarly, the third and the fourth phases are "term" and "term-done". Users are separately configured for "orig" and "term" sequencing. E.g. a call authorization app may only be interested in calls that are being locally originated. Therefore it does not need to be sequenced for incoming calls to this user.

Again further, the FIG. 4 illustrates a call arriving at the CSSF from an unknown user for which no IMS sequencing is configured. The figure also shows a second conventional sequenced app. As part of this invention, the first sequenced app has a standby server that can take over if the active server fails. Therefore the first two sequenced apps are a HA Pair and should not need to be explicitly configured as separate sequences.

Figure 5:
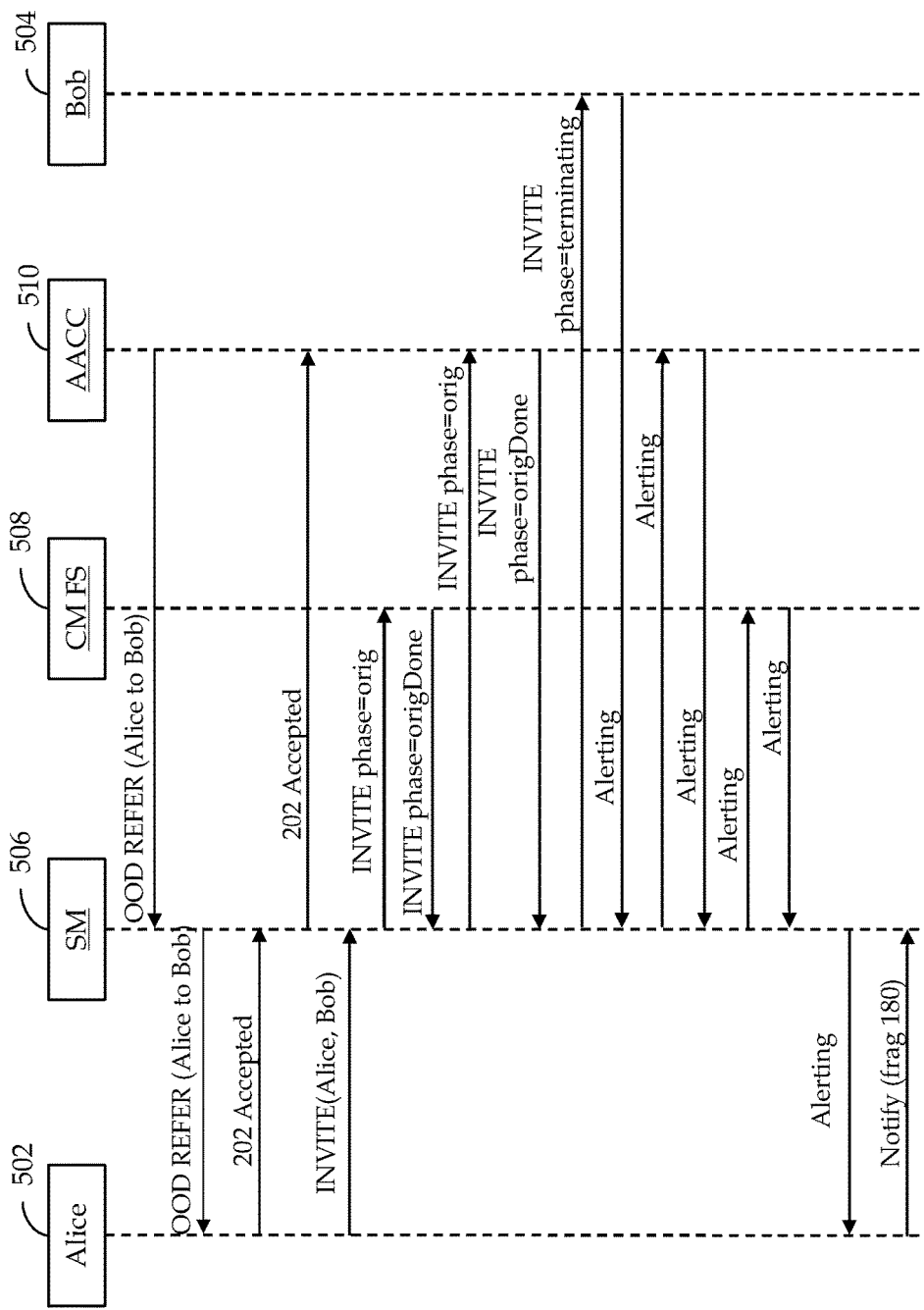
FIG. 5 is an illustration of a high level outgoing call flow in an IMS architecture.

FIG. 5 is an illustration of a high level outgoing call flow in an IMS architecture, as known in the art. As shown, user Alice 502 is an agent and is a part of an IMS network. User Alice has called a customer user Bob 504 who is again a part of the IMS network. Further, the box 506 represents a session manager that manages the high availability of services for its clients (as described earlier in conjunction with FIGS. 1, 2, and 3 of the present invention).

Further, as shown, the boxes 508 and 510 are the sequenced applications. User Alice 502 is known to the IMS system and the two applications 508 and 510 are sequenced for originating calls from user Alice 502. Furthermore, no applications are sequenced for calls terminating at user Bob 504. As user Alice 502 calls user Bob 504, SM 506 routes to CM-FS 508 as the first sequenced application. Further, CM-FS 508 sends a new INVITE (IMS phase origDone) back to the SM 506. Thereafter, SM 506 routes to the AACC 510 as the second sequenced app on the 'orig' side of the call. Then the AACC 510 learns that user Alice 502 is originating a call. Then the AACC 510 creates a B2BUA and sends a new INVITE (phase origDone) back to the SM 506. Then the AACC 510 also models the call in its business logic. Since user Bob 504 is not sequenced, the SM 506 does no IMS term processing and simply routes the call to user Bob 504. Moreover, when user Bob 504 returns 180 Ringing, the message traverses the AACC 510 B2BUA and the call model state for user Bob 504 is updated to Alerting. In other words, the call does not reach user Bob 504 until both the active and the standby servers already have their full state modeled. Therefore, in order to be synchronized, the active server should see and handle the call before the standby server.

Figure 6A:
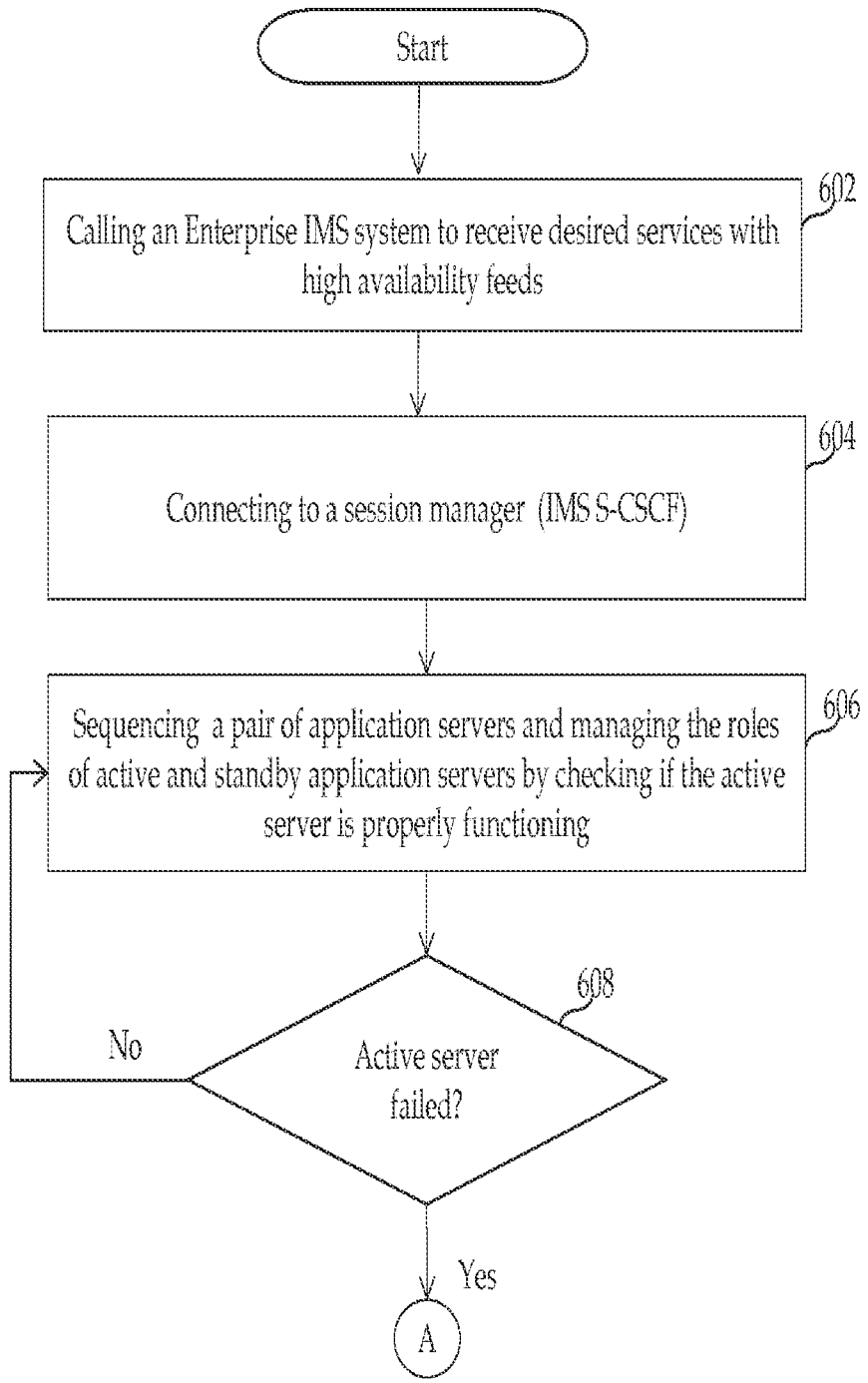
FIG. 6A-B illustrates a flow diagram of a method to provide a high availability pair of application servers within an enterprise IMS network, in accordance with an embodiment of the present invention.
Figure 6B:
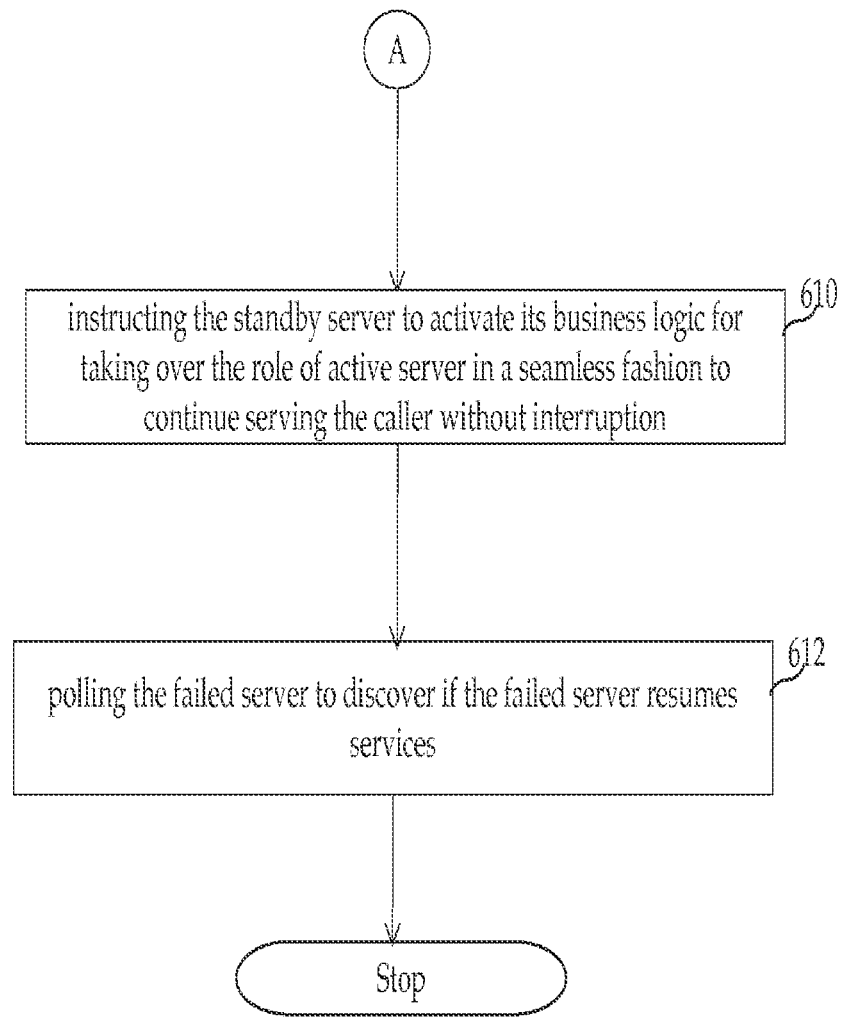

FIG. 6A-B illustrates a flow diagram of a method to provide a high availability pair of application servers within an enterprise IMS network, in accordance with an embodiment of the present invention. The method may be understood more clearly when, the description corresponding to the method, is read in conjunction with FIGS. 1, 2, and 3 of the present invention. The order in which the method is performed is not intended to be construed as limitation, and further any number of the method steps may be combined in order to implement the method or an alternative method without departing from the scope of the invention.

At step 602, a caller being a customer, of an organization that serves certain online services to its clients, calls to the organization to gain high availability feeds for the particular service. At step 604, the caller gets connected with a session manager that manages a highly available pair of application servers those provide the services desired by the caller. Also, at step 606, the session manager sequences the pair of the application servers in order to enable the pair to be in sync with each other. Further, at step 606, the session manager keeps a check on roles played by the application servers as active server or standby server.

Further, the session manager provides a configurable high availability option that automatically generates a serial sequencing of the standby application server after the active sequence is complete. In addition, the active and standby application roles are managed by the session manager using a SIP-based mechanism, so that the active and standby are aware of their roles. A standby server may normally process SIP events in the same way as the active server. However, the standby server may not produce business logic events for its client.

Furthermore, the session manager informs the standby server of its role, rather than the applications servers needing to coordinate these roles themselves. The session manager can use SIP-based health-check mechanism to determine the status of each of the servers. In an embodiment, lack of responsiveness to any SIP request can be used by the session manager to instruct the role change to take place.

Further, at step 608, if the session manager determines that the active server is failed, then at step 610, the session manager may send a SIP message to the standby server to take over. The standby server only needs to activate its business logic since its SIP stack is already active. Thereafter, the session manager removes the previously active server from the signaling path of subsequent messages only if it the active server is down (unresponsive or otherwise incapable of processing SIP messages). Otherwise, the session manager may keep tracking the active server (as shown in step 606) to determine if at any time the active server goes down.

Furthermore, if the session manager detects that the active application server is unresponsive then the session manager automatically removes the active server from the sequence. Further, the session manager informs the standby to change its role to active (as shown in step 610). On the other hand, the session manager continues to sequence the newly active application only. In this way, the standby server takes over seamlessly and with zero interruption to the service. Furthermore, at step 612 the session manager continues to poll the unresponsive machine with SIP instructions so that the session manager could be able to discover any restoration of service.

In another embodiment, the sequencing of the active and the standby applications can optionally be performed in the context of an atomic network transaction. This guarantees that the sequenced event is sent to both servers at the same time. In a further embodiment, call setup time can be reduced by configuring the session manager to sequence active and standby applications in parallel rather than serially. Within this embodiment of the invention, the session manager would be configured to use its "parallel mode" of highly available application support, typically where both the active and standby are geographically remote from the location of the session manager. The session manager may copy the sequence to both active and standby. When the standby completes its sequence back to the session manager, the session manager in this situation does not propagate the standby server to the next SIP Entity. Transaction isolation can be achieved by configuring the session manager to ensure that both applications have processed the sequence before continuing with the next stage of processing.

Alternatively, the session manager can begin the next stage, which is to propagate the INVITE message downstream. The stage after that involves responses, when the session manager has received what it needs from the active server. When the acknowledgement messages for this dialog occur, the session manager does send these back towards the standby application. Effectively, the session manager is strategically forking and terminating sequence dialogs within the enterprise IMS network in a targeted way that causes the standby server to shadow the active server. This means that the standby is kept fully in sync with the dialog, and is able to take over processing for this dialog as soon as the session manager detects that the active application is unresponsive. There is zero downtime experienced in the event of a standby application failure from a call signaling perspective.

Further, the method is not restricted to above information as mentioned herein. The various embodiments that are explained in FIGS. 1, 2, 3, 4, and 5 may be utilized by each of the methods as explained here above. Further, the invention is not limited to above-mentioned embodiments and examples and many other embodiments and examples may be implemented in light of the invention without departing from the scope of the invention.

It may be appreciated by the person skilled in the art that the present invention is not limited to the above-mentioned embodiments. Further, various other embodiments may also be implemented through the features provided by the system. Also, the usage of terminology such as 'session manager', 'active server', 'standby server' may not be considered as restrictive aspect of the present invention as such terminologies are used just for the purpose of better explanation.

Advantageously, the present invention provides a method and system to provide a high availability pair of application servers that enables zero interruption in the deployment of the service. Also, there is zero downtime experienced in the event of a server failure from a call signalling perspective. Further, embodiments of the present invention may be able to reduce capital and operating costs of a system, by supporting reduction of the cost of maintaining standby servers to achieve high availability of the application servers.

It may be appreciated by a person skilled in the art that the invention is not limited to the advantages as mentioned here above. Further many other advantages may be understood in light of the description given above without departing from the scope of the invention.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions that execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A high availability enterprise IMS system comprising:
   a processor coupled to memory where the processor executes program code stored in memory to implement:
      a session manager that manages active and standby roles of managed servers to define an active application server and a standby application server, wherein a stack unit of the active application server and a stack unit of the standby application server function independently;
   wherein:
      the stack unit of the active application server and the stack unit of the standby application server process events associated with communication with the session manager;
      the session manager manages synchronization of the active application server and the standby application server by sequencing data to both the stack unit of the active application server and the stack unit of the standby application server; and the session manager, upon detecting that the active application server is unavailable, instructs the standby application server to take over the role of the active application server.

2. The system of claim 1, wherein the stack unit of the active application server and the stack unit of the standby application server each comprises a SIP stack unit; wherein:
the active application server and the standby application server each further comprise a business logic unit;
the SIP stack unit of the active application server is in an active state;
the SIP stack unit of the standby application server is in an active state;
the business logic unit of the active application server is in an active state that generates events;
the business logic unit of the standby application server is in an inactive state; and
the session manager processes the events received from the active business logic unit.

3. The system of claim 1, wherein the session manager routes SIP messages in a serial fashion to the active application server and the standby application server wherein both the standby application server and the active application server are configured to process the received SIP events.

4. The system of claim 1, wherein the session manager is further configured to remove the active application server from an active role based upon a determination of malfunctioning in the active application server.

5. The system of claim 1, wherein the session manager is configured to ensure simultaneous arrival of sequenced events at the active application server and the standby application server.

6. The system of claim 1, wherein the session manager routes SIP messages in a parallel fashion to the active application server and the standby application server wherein both the standby application server and the active application server are configured to process the received SIP events.

7. The system of claim 1, wherein the session manager controls the status of the active application server and the standby application server without direct polling between the active application server and the standby application server such that the active server and the standby server are independent of the state of each other.

8. The system of claim 1, wherein the session manager monitors the status of the active application server and the standby application server by using a health check mechanism.

9. The system of claim 1, wherein the active application server pre-emptively communicates a fail-over request to the session manager so as to cause a changeover of the standby application server to the role of active before the active application server becomes unavailable.

10. The system of claim 1, wherein the session manager determines that the active application server is unavailable by detecting a lack of responsiveness to a request by the active application server.

11. The system of claim 1, wherein:
the stack unit of the active application server and the stack unit of the standby application server each comprises a SIP stack unit;
the active application server and the standby application server each further comprise a business logic unit;
the SIP stack unit of the active application server is in an active state;
the SIP stack unit of the standby application server is in an active state;
the business logic unit of the active application server is in an active state that generates events;
the business logic unit of the standby application server is in an inactive state; and
the session manager triggers a fail-over by sending a SIP message to the standby application server instructing the standby application server to activate its business logic unit.

12. The system of claim 1, wherein the session manager manages synchronization of the active application server and the standby application server by sequencing data to both the stack unit of the active application server and the stack unit of the standby application server in the context of an atomic network transaction, thus enabling the standby application server to take over the role of active at any timestamp.

13. The system of claim 1, wherein:
the session manager manages synchronization of the active application server and the standby application server by forking an invite sequence to both the active application server and the standby application server;
the session manager receives the sequence back from both the active application server and the standby application server; and
the session manager sends the active application server sequence, but not the standby application server sequence, to a next hop.

14. The system of claim 13, wherein:
the session manager further waits until the session is received from both the active application server and the standby application server before sending the active server sequence to the next hop.

15. The system of claim 1, wherein:
the session manager performs parallel forking of sequences to the active application server and the standby application server;
the session manager proceeds to a next hop on receipt of an invite phase complete message from the active server and without having received an invite phase complete message from the standby server, thus strategically forking and terminating sequence dialogs within the enterprise IMS to cause the standby application server to shadow the active application server and remain fully in synchronization with the active application server.

16. The system of claim 1, wherein the processor further executes code stored in memory to implement a graphical user interface that exposes a SIP entity configuration input having a field that controls whether serial or parallel mode is desired for sequencing.

17. The system of claim 1, wherein:
the processor further executes code stored in memory to implement a graphical user interface that allows a user to select a control that determines whether the active application server and the standby application server operate in either proxy or B2B mode such that:
in proxy mode, faster propagation is realized compared to B2B mode, but with no status or control of established sequencing dialogs; and
in B2B mode, slower propagation is realized compared to proxy mode, but with status and control of established sequencing dialogs; and
thus facilitating an option of trading speed for desired level of functional restoration.

18. A computer-implemented method of providing high availability of services in an enterprise IMS network, comprising:
   performing by a processor, sequencing and synchronizing an active application server and a standby application server, wherein a stack unit of the active application server and a stack unit of the standby application server function independently and the stack unit of the active application server and the stack unit of the standby application server process events associated with communication with the session manager by:
      routing, by the processor, SIP messages to both the stack unit of the active application server and the stack unit of the standby application server such that the active application server and the standby application server are synchronized;
      determining, by the processor, an active and standby role of the active application server and the standby application server based upon a status of the active application server; and
      instructing, by the processor, the standby application server to take over the role of the active application server, upon detecting that the active application server is unavailable.

19. The method of claim 18, wherein the stack unit of the active application server and the stack unit of the standby application server each comprises SIP stack unit, the active application server and the standby application server each further comprising a business logic unit, the method further comprising:
   designating, by the processor, the SIP stack unit of the active application server to be in an active state;
   designating, by the processor, the SIP stack unit of the standby application server to be in an active state;
   designating, by the processor, the business logic unit of the active application server to be in an active state that generates events;
   designating, by the processor, the business logic unit of the standby application server to be in an inactive state; and
   further comprising removing the active application server from an active role based upon a determination of malfunctioning in the active application server and by changing the business logic unit of the standby application server to an active state.

20. The method of claim 18, wherein:
routing, by the processor, SIP messages to both the stack unit of the active application server and the stack unit of the standby application server, comprises:
   routing, by the processor, SIP messages in a serial fashion to the active application server and the standby application server wherein both the standby application server and the active application server are configured to process the received SIP events.

21. The method of claim 18, wherein:
routing, by the processor, SIP messages to both the stack unit of the active application server and the stack unit of the standby application server, comprises:
   routing, by the processor, SIP messages in a parallel fashion to the active application server and the standby application server wherein both the standby application server and the active application server are configured to process the received SIP events.

22. The method of claim 18, further comprising:
controlling, by the processor, the status of the active application server and the standby application server without direct polling between the active application server and the standby application server such that the active server and the standby server independent of the state of each other.

23. The method of claim 18, further comprising:
monitoring, by the processor, the status of the active application server and the standby application server by using a health check mechanism.

24. The method of claim 18, wherein:
instructing, by the processor, the standby application server to take over the role of the active application server, upon detecting that the active application server is unavailable comprises a select one of:
   receiving, by the processor, a pre-emptively communicated a fail-over request from the active application server and instructing the standby application server to take over the role of the active application server before the active application server becomes unavailable; and
   determining that the active application server is unavailable by detecting a lack of responsiveness to a request by the active application server and then instructing the standby application server to take over the role of the active application server.

25. The method of claim 18, wherein:
routing, by the processor, SIP messages to both the stack unit of the active application server and the stack unit of the standby application server, comprises:
   sequencing data to both the stack unit of the active application server and the stack unit of the standby application server in the context of an atomic network transaction, thus enabling the standby application server to take over the role of active at any timestamp.

* * * * *

UNITED STATES PATENT AND TRADEMARK OFFICE
CERTIFICATE OF CORRECTION

PATENT NO.        : 10,104,130 B2
APPLICATION NO.   : 13/629864
DATED             : October 16, 2018
INVENTOR(S)       : Neil O'Connor and Diarmuid Leonard It is certified that error appears in the above-identified patent and that said Letters Patent is hereby corrected as shown below:

In the Claims

Column 16 In Claim 22, Line 18, "active server and the standby server independent of the" should read --active server and the standby server are independent of the--
Column 16 In Claim 24, Lines 29-31, "communicated a fail-over request from the active application" should read --communicated fail-over request from the active application--

Signed and Sealed this
Sixteenth Day of April, 2019

Andrei Iancu
*Director of the United States Patent and Trademark Office*